US011151301B2

United States Patent
Wachs et al.

(10) Patent No.: US 11,151,301 B2
(45) Date of Patent: Oct. 19, 2021

(54) POINT-TO-POINT MODULE CONNECTION INTERFACE FOR INTEGRATED CIRCUIT GENERATION

(71) Applicant: SiFive, Inc., San Mateo, CA (US)

(72) Inventors: Megan Wachs, San Francisco, CA (US); Henry Cook, Berkeley, CA (US); Wesley Waylon Terpstra, San Mateo, CA (US)

(73) Assignee: SiFive, Inc., San Mateo, CA (US)

( * ) Notice: Subject to any disclaimer, the term of this patent is extended or adjusted under 35 U.S.C. 154(b) by 0 days.

(21) Appl. No.: 16/851,966

(22) Filed: Apr. 17, 2020

(65) Prior Publication Data

US 2020/0387659 A1 Dec. 10, 2020

Related U.S. Application Data

(60) Provisional application No. 62/857,780, filed on Jun. 5, 2019.

(51) Int. Cl.
*G06F 30/398* (2020.01)
*G06F 30/333* (2020.01)

(52) U.S. Cl.
CPC .......... *G06F 30/398* (2020.01); *G06F 30/333* (2020.01)

(58) Field of Classification Search
USPC .......................................................... 716/52
See application file for complete search history.

(56) References Cited

U.S. PATENT DOCUMENTS

| 2008/0040699 A1* | 2/2008 | Okada | G06F 30/30 716/104 |
| 2015/0186589 A1* | 7/2015 | Jayakumar | G06F 30/392 716/119 |

OTHER PUBLICATIONS

"diplomacy: add BundleBridge for cross-module bundles"; GitHub, Jun. 6, 2018; 2 pages; available at https://github.com/chipsalliance/rocket-chip/pull/1473.
"Clock Crossings: make API more flexible with Crossing Helper #1537"; GitHub, Jul. 16, 2018; 4 pages; available at https://github.com/chipsalliance/rocket-chip/pull/1537.
"Better crossings deployed to bus and tile wrappers #1065"; GitHub, Oct. 26, 2017; 4 pages; available at https://github.com/chipsalliance/rocket-chip/pull/1065.

(Continued)

*Primary Examiner* — Bryce M Aisaka
(74) *Attorney, Agent, or Firm* — Young Basile Hanlon & MacFarlane, P.C.

(57) ABSTRACT

Systems and methods are disclosed for generation and testing of integrated circuit designs with point-to-point connections between modules. These may allow for the rapid design and testing (e.g. silicon testing) of processors and SoCs. For example, type parameterization may be used to generate point-to-point connections in a flexible manner. For example, a point-to-point connection between the source module and the sink module that includes one or more named wires specified by bundle type may be automatically generated based on using the bundle type as a type parameterization input. For example, these system and methods may be used to rapidly connect a custom processor design, including one or more IP cores, to a standard input/output shell for a SoC design to facilitate rapid silicon testing of the custom processor design.

20 Claims, 8 Drawing Sheets

(56) References Cited

OTHER PUBLICATIONS

"Auto diplomacy bundles #993"; GitHub, Sep. 27, 2017; 5 pages; available at https://github.com/chipsalliance/rocket-chip/pull/993.
"Refactor TLBusWrapper and CrossingHelper #1548"; GitHub, Jul. 23, 2018, 3 pages; available at https://github.com/chipsalliance/rocket-chip/pull/1548.
Cook; Lazy Module.scala #L171; GitHub, Oct. 6, 2018, 7 pages; available at https://github.com/chipsalliance/rocket-chip/blob/2c1ad08b7fb9beb80634839bdcf0e914dadf11dc/src/main/scala/diplomacy/LazyModule.scala#L171.
Cook; Lazy Module.scala #L239; GitHub, Oct. 6, 2018, 7 pages; available at https://github.com/chipsalliance/rocket-chip/blob/2c1ad08b7fb9beb80634839bdcf0e914dadf11dc/src/main/scala/diplomacy/LazyModule.scala#L239.

\* cited by examiner

POINT-TO-POINT MODULE CONNECTION INTERFACE FOR INTEGRATED CIRCUIT GENERATION

CROSS-REFERENCE TO RELATED APPLICATION(S)

This application claims the benefit of U.S. Provisional Application No. 62/857,780, filed on Jun. 5, 2019, which is incorporated herein by reference in its entirety.

TECHNICAL FIELD

This disclosure relates to a point-to-point module connection interface to facilitate generation of integrated circuit designs.

BACKGROUND

Integrated circuits are typically designed and tested in a multi-step process that involves multiple specialized engineers performing a variety of different design and verification tasks on an integrated circuit design. A variety of internal or proprietary (e.g. company-specific) integrated circuit design tool chains are typically used by these engineers to handle different parts of the integrated circuit design workflow of using commercial electronic design automation (EDA) tools.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
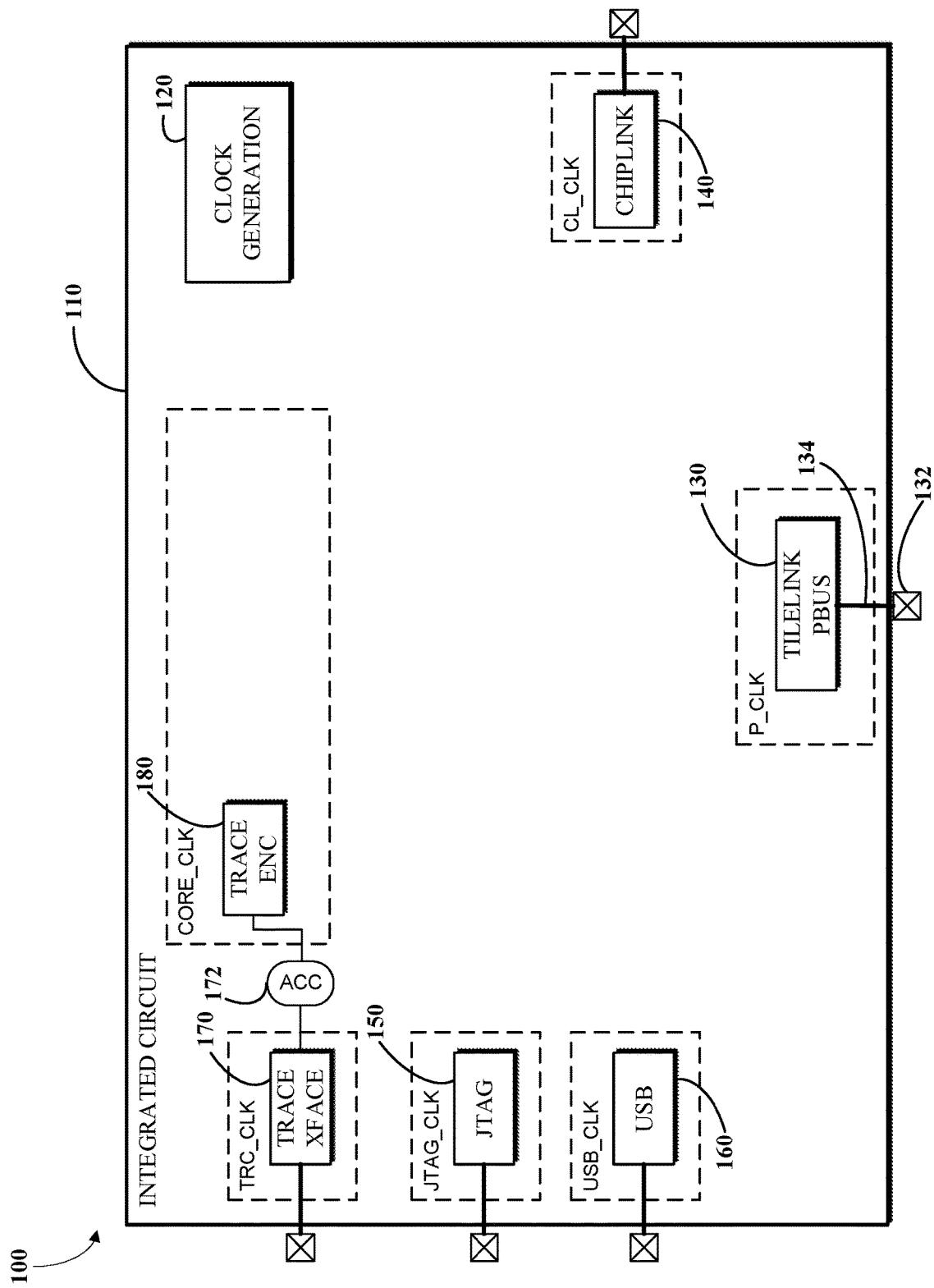
FIG. 1 is block diagram of an example of an integrated circuit design including an input/output shell.

Systems and methods for providing point-to-point module connection interface to facilitate generation of integrated circuit designs are described herein. Type parameterization may be used in a hardware description language (e.g., Scala/Chisel) to facilitate the generation of point-to-point connections between modules in an integrated circuit design. For example, a point-to-point connection between a source module and a sink module may be automatically generated, based on using the bundle type as a type parameterization input, where the connection includes one or more named wires specified by the bundle type. In some implementations, the bundle type that is passed to the connection generation interface includes data specifying directionality and/or widths of the named wires of the corresponding bundle. This technique may enable the automated generation of point-to-point connections between modules in an integrated circuit design with an arbitrary collection wires that only needs to be specified once, rather than being coded at multiple layers of register-transfer logic module hierarchy.

For example, these techniques may be employed as part of a larger integrated circuit design flow. For example, these techniques may be employed to facilitate the generation of point-to-point connections between modules of a standard input/output shell and custom processor logic, which may facilitate rapid fabrication and silicon testing of the custom processor logic.

In a first aspect, the subject matter described in this specification can be embodied in methods that include accessing an indication of a source module of an integrated circuit design; accessing an indication of a sink module of the integrated circuit design; accessing an indication of a bundle type, wherein the bundle type specifies one or more named wires; automatically generating, based on using the bundle type as a type parameterization input, a point-to-point connection between the source module and the sink module that includes the one or more named wires specified by the bundle type; generating a register-transfer level data structure for the integrated circuit design including the source module, the sink module, and the point-to-point connection; and storing or transmitting the register-transfer level data structure.

In a second aspect, the subject matter described in this specification can be embodied in systems that include a network interface, a memory, and a processor, wherein the memory includes instructions executable by the processor to cause the system to: access an indication of a source module of an integrated circuit design; access an indication of a sink module of the integrated circuit design; access an indication of a bundle type, wherein the bundle type specifies one or more named wires; automatically generate, based on using the bundle type as a type parameterization input, a point-to-point connection between the source module and the sink module that includes the one or more named wires specified by the bundle type; and generate a register-transfer level data structure for the integrated circuit design including the source module, the sink module, and the point-to-point connection.

In a third aspect, the subject matter described in this specification can be embodied in a non-transitory computer-readable storage medium that includes instructions that, when executed by a processor, facilitate performance of operations comprising: accessing an indication of a source module of an integrated circuit design; accessing an indication of a sink module of the integrated circuit design; accessing an indication of a bundle type, wherein the bundle type specifies one or more named wires; automatically generating, based on using the bundle type as a type parameterization input, a point-to-point connection between the source module and the sink module that includes the one or more named wires specified by the bundle type; generating a register-transfer level data structure for the integrated circuit design including the source module, the sink module, and the point-to-point connection; and storing or transmitting the register-transfer level data structure.

Some implementations may provide advantages over prior systems and methods, such as automating significant parts of integrated circuit design flow; helping to enable fast silicon testing of new processor designs when used with a system-on-a-chip input/output design; and reducing development and testing time for integrated circuits.

FIG. 1 is block diagram of an example of an integrated circuit design 100 including an input/output shell. The integrated circuit 110 includes a clock generation module 120, a collection of interface modules (130, 140, 150, 160 and 170) connected to pins of the integrated circuit, and a trace encoder module 180. The interface modules include a TileLink PBus module 130; a ChipLink module 140; a JTAG module 150; a USB module 160; a trace interface module 170; and a trace encoder module 180, which each are in their own respective clock domains. The trace encoder module 180 is connected to trace interface module 170 by an asynchronous clock crossing 172. For example, the modules of this input/output shell may provide a standard interface transferring data to between one or more processors, which may be added to the integrated circuit design 100, and external devices (e.g., a silicon testing apparatus). The input/output shell of the integrated circuit design 100 can thus be used to facilitate rapid testing of a new processor design in silicon.

Peripheral input/outputs may be auto-punched from inside the hierarchy to the pad level. For example, the TileLink PBus module 130, may be connected to the pad level pins 132 via a bundle of wires 134 that transcend a module hierarchy of the integrated circuit design 100. For example, the process 500 of FIG. 5 may be implemented to generate the bundle of wires 134 connecting the TileLink PBus module 130 to the pad level pins 132.

For example, the clock generation module 120 may include a high-frequency crystal, a phase locked loop, an oscillator, a switch, and/or a real-time clock. For example, the TileLink PBus module may include pins for mode selection, a Serial Peripheral Interface (SPI), an Inter-Integrated Circuit (I2C), a Universal Asynchronous Receiver/Transmitter (UART), a pulse width modulation (PWM), and/or General Purpose Input/Output (GPIO).

Figure 2:
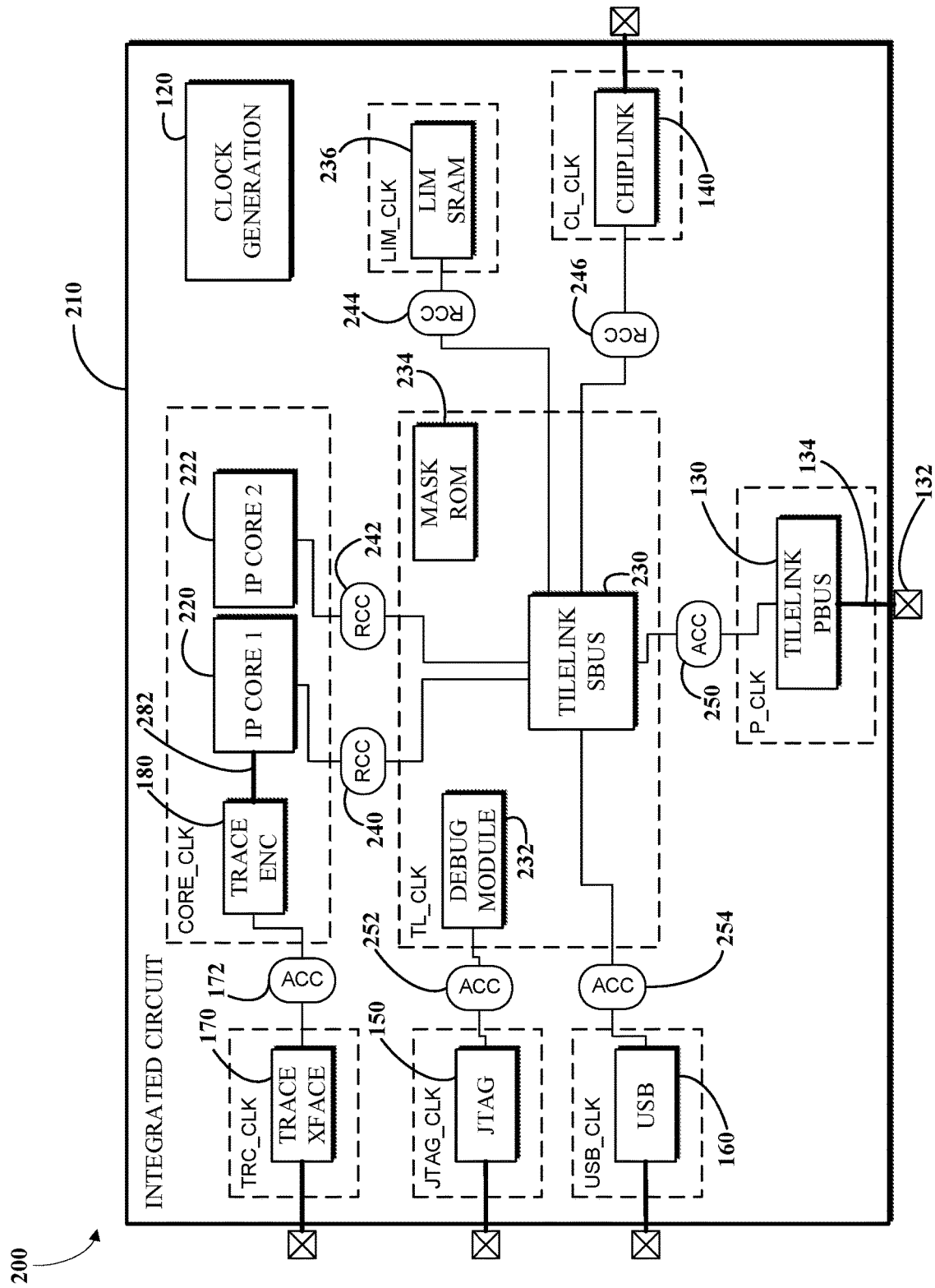
FIG. 2 is block diagram of an example of an integrated circuit design including the input/output shell and custom processor logic.

FIG. 2 is block diagram of an example of an integrated circuit design 200 including the input/output shell of FIG. 1 and custom processor logic. The integrated circuit 210 includes custom modules (220, 222, 230, 232, 234, and 236) in three clock domains: core_clk, tl_clk, and lim_clk; along with interface modules of the input/output shell (130, 140, 150, 160, 170, and 180) in their five respective clock domains; p_clk, cl_clk, jtag_clk, usb_clk, trc_clk, and core_clk. A user may quickly merge the custom processor logic with the input/output shell by issuing commands to cause clock crossings to be automatically generated between modules in different clock domains of the integrated circuit 210. In this example, the custom processor logic of the integrated circuit design 200 includes a first IP core module 220 and a second IP core module 222 that are connected to a TileLink SBus module 230 by a rational clock crossing (RCC) 240 and a rational clock crossing 242. A debug module 232 in the tl_clk clock domain is connected to the JTAG module 150 in the jtag_clk clock domain by an asynchronous clock crossing (ACC) 252. A mask ROM module 234 is also included in the tl_clk clock domain and may be connected to the TileLink SBus module 230 by intra-clock domain connections (not explicitly shown in FIG. 2). A LIM SRAM module 236 in the lim_clk clock domain is connected to the TileLink SBus module 230 by a rational clock crossing 244. The ChipLink module 140 in the cl_clk clock domain is connected to the TileLink SBus module 230 by a rational clock crossing 246. The TileLink PBus module 130 in the p_clk clock domain is connected to the TileLink SBus module 230 by an asynchronous clock crossing 250. The USB module 160 in the usb_clk clock domain is connected to the TileLink SBus module 230 by an asynchronous clock crossing 254. The first IP core module 220 and trace encoder module 180 are connected by a bundle of wires 282 within the core_clk clock domain. For example, the process 500 of FIG. 5 may be implemented to generate the bundle of wires 282 connecting the first IP core module 220 of the custom processor logic to the trace encoder module 180 of the input/output shell in the integrated circuit design 200. The resulting integrated circuit design 200 may then be rapidly tested using system 300 of FIG. 3, the process 700 of FIG. 7 and/or the process 800 of FIG. 8.

Figure 3:
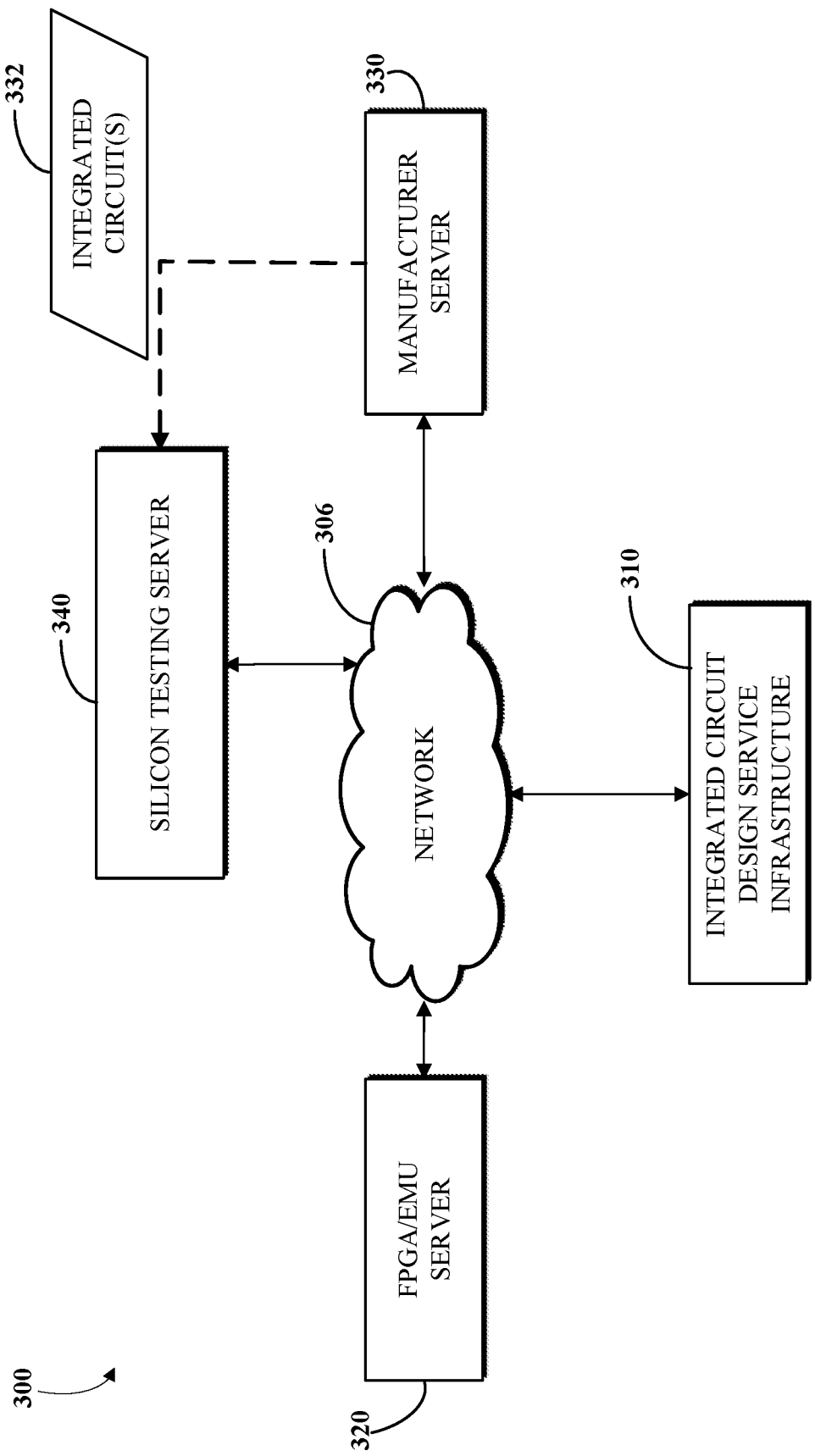
FIG. 3 is block diagram of an example of a system for facilitating design and manufacture of integrated circuits.

FIG. 3 is block diagram of an example of a system 300 for facilitating design and manufacture of integrated circuits. The system 300 includes, the network 306, the integrated circuit design service infrastructure 310, an FPGA/emulator server 320, and a manufacturer server 330. For example, a user may utilize a web client or a scripting API client to command the integrated circuit design service infrastructure 310 to automatically generate an integrated circuit design based a set of design parameter values selected by the user for one or more template integrated circuit designs. In some implementations, the integrated circuit design service infrastructure 310 may be configured to automatically generate a point-to-point connection between modules of an integrated circuit (e.g., between a source module including an IP core and the sink module that is a component of an input/output shell for a system-on-a-chip design).

For example, the integrated circuit design service infrastructure 310 may invoke (e.g., via network communications over the network 306) testing of the resulting design that is performed by the FPGA/emulation server 320 that is running one or more FPGAs or other types of hardware or software emulators. For example, the integrated circuit design service infrastructure 310 may invoke a test using a field programmable gate array, programmed based on a field programmable gate array emulation data structure, to obtain an emulation result. The field programmable gate array may be operating on the FPGA/emulation server 320, which may be a cloud server. Test results may be returned by the FPGA/emulation server 320 to the integrated circuit design service infrastructure 310 and relayed in a useful format to the user (e.g., via a web client or a scripting API client).

The integrated circuit design service infrastructure 310 may also facilitate the manufacture of integrated circuits using the integrated circuit design in a manufacturing facility associated with the manufacturer server 330. In some implementations, a physical design specification (e.g., a GDSII file) based on a physical design data structure for the integrated circuit is transmitted to the manufacturer server 330 to invoke manufacturing of the integrated circuit (e.g., using manufacturing equipment of the associated manufacturer). For example, the manufacturer server 330 may host a foundry tape out website that is configured to receive physical design specifications (e.g., as a GDSII file or an OASIS file) to schedule or otherwise facilitate fabrication of integrated circuits. In some implementations, the integrated circuit design service infrastructure 310 supports multitenancy to allow multiple integrated circuit designs (e.g., from one or more users) to share fixed costs of manufacturing (e.g., reticle/mask generation, and/or shuttles wafer tests). For example, the integrated circuit design service infrastructure 310 may use a fixed package (e.g., a quasistandardized packaging) that is defined to reduce fixed costs and facilitate sharing of reticle/mask, wafer test, and other fixed manufacturing costs. For example, the physical design specification may include one or more physical designs from one or more respective physical design data structures in order to facilitate multi-tenancy manufacturing.

In response to the transmission of the physical design specification, the manufacturer associated with the manufacturer server 330 may fabricate and/or test integrated circuits based on the integrated circuit design. For example, the associated manufacturer (e.g., a foundry) may perform optical proximity correction (OPC) and similar post-tapeout/pre-production processing, fabricate the integrated circuit(s) 332, update the integrated circuit design service infrastructure 310 (e.g., via communications with a controller or a web application server) periodically or asynchronously on the status of the manufacturing process, performs appropriate testing (e.g., wafer testing) and send to packaging house for packaging. A packaging house may receive the finished wafers or dice from the manufacturer and test materials, and update the integrated circuit design service infrastructure 310 on the status of the packaging and delivery process periodically or asynchronously. In some implementations, status updates may be relayed to the user when the user checks in using the web interface and/or the controller might email the user that updates are available.

In some implementations, the resulting integrated circuits 332 (e.g., physical chips) are delivered (e.g., via mail) to a silicon testing service provider associated with a silicon testing server 340. In some implementations, the resulting integrated circuits 332 (e.g., physical chips) are installed in a system controlled by silicon testing server 340 (e.g., a cloud server) making them quickly accessible to be run and tested remotely using network communications to control the operation of the integrated circuits 332. For example, a login to the silicon testing server 340 controlling a manufactured integrated circuits 332 may be sent to the integrated circuit design service infrastructure 310 and relayed to a user (e.g., via a web client). For example, the integrated circuit design service infrastructure 310 may implement the process 700 of FIG. 7 to control testing of one or more integrated circuits 332, which may be structured based on a register-transfer level data structure (e.g., a register-transfer level data structure determined using the process 500 of FIG. 5 and/or the process 600 of FIG. 6). For example, the integrated circuit design service infrastructure 310 may implement the process 800 of FIG. 8 to control fabrication and silicon testing of one or more integrated circuits 332, which may be structured based on a register-transfer level data structure (e.g., a register-transfer level data structure determined using the process 500 of FIG. 5 and/or the process 600 of FIG. 6).

Figure 4:
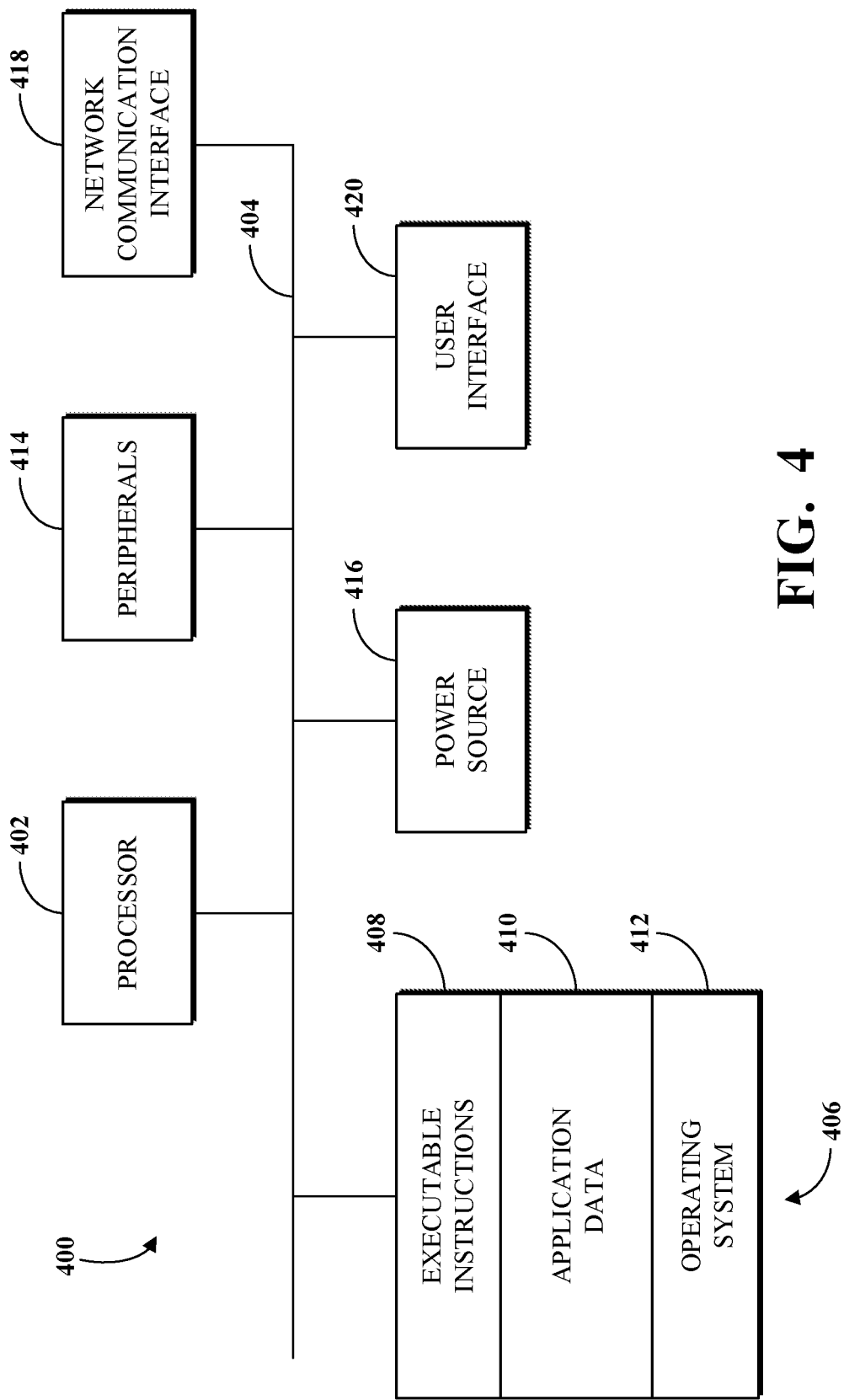
FIG. 4 is block diagram of an example of a system for facilitating design of integrated circuits.

FIG. 4 is block diagram of an example of a system 400 for facilitating design of integrated circuits. The system 400 is an example of an internal configuration of a computing device that may be used to implement the integrated circuit design service infrastructure 310 as a whole or one or more components of the integrated circuit design service infrastructure 310 of the system 300 shown in FIG. 3. The system 400 can include components or units, such as a processor 402, a bus 404, a memory 406, peripherals 414, a power source 416, a network communication interface 418, a user interface 420, other suitable components, or a combination thereof.

The processor 402 can be a central processing unit (CPU), such as a microprocessor, and can include single or multiple processors having single or multiple processing cores. Alternatively, the processor 402 can include another type of device, or multiple devices, now existing or hereafter developed, capable of manipulating or processing information. For example, the processor 402 can include multiple processors interconnected in any manner, including hardwired or networked, including wirelessly networked. In some implementations, the operations of the processor 402 can be distributed across multiple physical devices or units that can be coupled directly or across a local area or other suitable type of network. In some implementations, the processor 402 can include a cache, or cache memory, for local storage of operating data or instructions.

The memory 406 can include volatile memory, non-volatile memory, or a combination thereof. For example, the memory 406 can include volatile memory, such as one or more DRAM modules such as DDR SDRAM, and non-volatile memory, such as a disk drive, a solid state drive, flash memory, Phase-Change Memory (PCM), or any form of non-volatile memory capable of persistent electronic information storage, such as in the absence of an active power supply. The memory 406 can include another type of device, or multiple devices, now existing or hereafter developed, capable of storing data or instructions for processing by the processor 402. The processor 402 can access or manipulate data in the memory 406 via the bus 404. Although shown as a single block in FIG. 4, the memory 406 can be implemented as multiple units. For example, a system 400 can include volatile memory, such as RAM, and persistent memory, such as a hard drive or other storage.

The memory 406 can include executable instructions 408, data, such as application data 410, an operating system 412, or a combination thereof, for immediate access by the processor 402. The executable instructions 408 can include, for example, one or more application programs, which can be loaded or copied, in whole or in part, from non-volatile memory to volatile memory to be executed by the processor 402. The executable instructions 408 can be organized into programmable modules or algorithms, functional programs, codes, code segments, or combinations thereof to perform various functions described herein. For example, the executable instructions 408 can include instructions executable by the processor 402 to cause the system 400 to automatically, in response to a command, generate an integrated circuit design and associated test results based on a design parameters data structure. The application data 410 can include, for example, user files, database catalogs or dictionaries, configuration information or functional programs, such as a web browser, a web server, a database server, or a combination thereof. The operating system 412 can be, for example, Microsoft Windows®, Mac OS X®, or Linux®; an operating system for a small device, such as a smartphone or tablet device; or an operating system for a large device, such as a mainframe computer. The memory 406 can comprise one or more devices and can utilize one or more types of storage, such as solid state or magnetic storage.

The peripherals 414 can be coupled to the processor 402 via the bus 404. The peripherals 414 can be sensors or detectors, or devices containing any number of sensors or detectors, which can monitor the system 400 itself or the environment around the system 400. For example, a system 400 can contain a temperature sensor for measuring temperatures of components of the system 400, such as the processor 402. Other sensors or detectors can be used with the system 400, as can be contemplated. In some implementations, the power source 416 can be a battery, and the system 400 can operate independently of an external power distribution system. Any of the components of the system 400, such as the peripherals 414 or the power source 416, can communicate with the processor 402 via the bus 404.

The network communication interface 418 can also be coupled to the processor 402 via the bus 404. In some implementations, the network communication interface 418 can comprise one or more transceivers. The network communication interface 418 can, for example, provide a connection or link to a network, such as the network 306, via a network interface, which can be a wired network interface, such as Ethernet, or a wireless network interface. For example, the system 400 can communicate with other devices via the network communication interface 418 and the network interface using one or more network protocols, such as Ethernet, TCP, IP, power line communication (PLC), WiFi, infrared, GPRS, GSM, CDMA, or other suitable protocols.

A user interface 420 can include a display; a positional input device, such as a mouse, touchpad, touchscreen, or the like; a keyboard; or other suitable human or machine interface devices. The user interface 420 can be coupled to the processor 402 via the bus 404. Other interface devices that permit a user to program or otherwise use the system 400 can be provided in addition to or as an alternative to a display. In some implementations, the user interface 420 can include a display, which can be a liquid crystal display (LCD), a cathode-ray tube (CRT), a light emitting diode (LED) display (e.g., an OLED display), or other suitable display. In some implementations, a client or server can omit the peripherals 414. The operations of the processor 402 can be distributed across multiple clients or servers, which can be coupled directly or across a local area or other suitable type of network. The memory 406 can be distributed across multiple clients or servers, such as network-based memory or memory in multiple clients or servers performing the operations of clients or servers. Although depicted here as a single bus, the bus 404 can be composed of multiple buses, which can be connected to one another through various bridges, controllers, or adapters.

Figure 5:
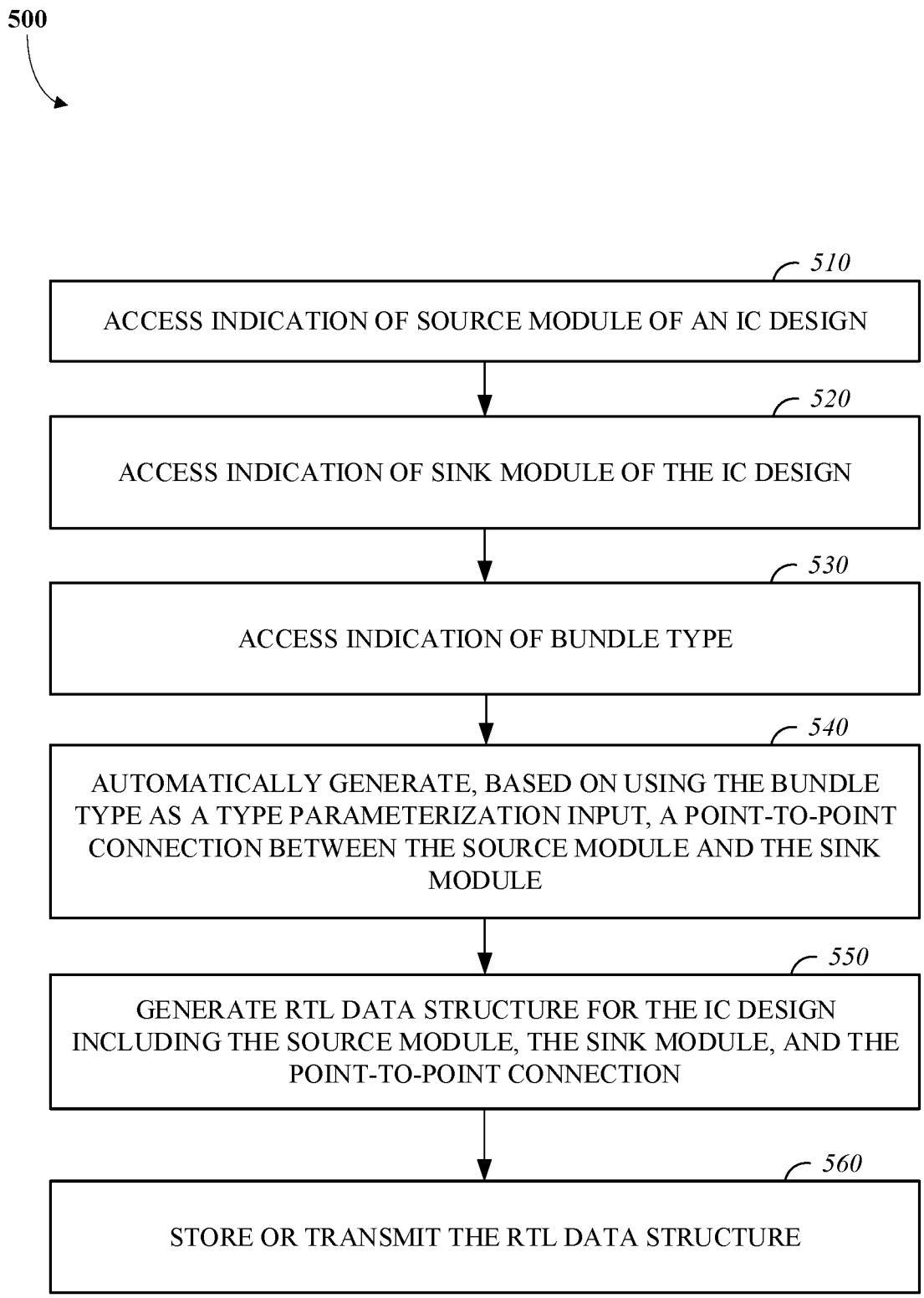
FIG. 5 is flow chart of an example of a process for connecting two modules in an integrated circuit design with a bundle of wires using type parameterization.

FIG. 5 is flow chart of an example of a process 500 for connecting two modules in an integrated circuit design with a bundle of wires using type parameterization. The process 500 includes accessing 510 an indication of a source module of an integrated circuit design; accessing 520 an indication of a sink module of the integrated circuit design; accessing 530 an indication of a bundle type; automatically generating 540, based on using the bundle type as a type parameterization input, a point-to-point connection between the source module and the sink module that includes one or more named wires specified by the bundle type; generating 550 a register-transfer level data structure for the integrated circuit design including the source module, the sink module, and the point-to-point connection; and storing or transmitting 560 the register-transfer level data structure. For example, the process 500 may be implemented by the system 300 of FIG. 3. For example, the process 500 may be implemented by the system 400 of FIG. 4.

The process 500 includes accessing 510 an indication of a source module of an integrated circuit design. In some implementations, the indication of the source module may be a data structure storing an instance of an object representing a logical circuit to be included in the integrated circuit design. For example, the data structure may include Scala code describing circuitry. In some implementations, the indication of the source module may be a pointer to an instance of an object representing a logical circuit to be included in the integrated circuit design. For example, the integrated circuit design may be of an IP core. For example, the integrated circuit design may be of a processor. For example, the integrated circuit design may be of a system-on-a-chip. In some implementations, the integrated circuit design may describe a system-on-a-chip including a custom processor and an input/output shell configured to transfer to and/or from devices external to the system-on-a-chip. For example, the integrated circuit design may describe the integrated circuit of 210 of FIG. 2. For example, the indication of the source module may be accessed 510 by receiving the indication of the source module (e.g., via network communications using the network communications interface 418). For example, the indication of the source module may be accessed 510 by reading the indication of the source module from memory (e.g., reading from the memory 406 via the bus 404).

The process 500 includes accessing 520 an indication of a sink module of the integrated circuit design. In some implementations, the indication of the sink module may be a data structure storing an instance of an object representing a logical circuit to be included in the integrated circuit design. For example, the data structure may include Scala code describing circuitry. For example, the source module may include an IP core (e.g., the first IP core module 220) and the sink module may be a component of an input/output shell (e.g., the input/output shell of the integrated circuit design 100 of FIG. 1) for a system-on-a-chip design (e.g., the integrated circuit design 200). In some implementations, the indication of the sink module may be a pointer to an instance of an object representing a logical circuit to be included in the integrated circuit design. For example, the indication of the sink module may be accessed 520 by receiving the indication of the sink module (e.g., via network communications using the network communications interface 418). For example, the indication of the sink module may be accessed 520 by reading the indication of the sink module from memory (e.g., reading from the memory 406 via the bus 404).

The process 500 includes accessing 530 an indication of a bundle type. The bundle type specifies one or more named wires. In some implementations, the bundle type specifies respective widths (e.g., a number of conductors grouped as a named wire) of the one or more named wires. In some implementations, the bundle type specifies respective directionalities (e.g., sending vs. receiving or master vs. slave) of the one or more named wires. In some implementations, the indication of the bundle type may be a data structure storing a logical description of a bundle of wires. For example, the data structure may include Scala code describing the wires in a bundle of wires. For example, a bundle type defined for a serial peripheral interface (SPI) may specify four named wires: serial clock (SCLK), master output slave input (MOSI), master input slave output (MISO), and slave select (SS). For example, a bundle type defined for a control of a three color LED may specify three named wires: red, green, and blue. In some implementations, the indication of the bundle type may be a pointer to a data structure storing a logical description of a bundle of wires. For example, the indication of the bundle type module may be accessed 530 by receiving the indication of the bundle type (e.g., via network communications using the network communications interface 418). For example, the indication of the bundle type may be accessed 530 by reading the indication of the bundle type from memory (e.g., reading from the memory 406 via the bus 404).

The process 500 includes automatically generating 540, based on using the bundle type as a type parameterization input, a point-to-point connection between the source module and the sink module that includes the one or more named wires specified by the bundle type. For example, the bundle type may be passed as a type parameter to a method for point-to-point connection generation of an object representing circuitry. In some implementations, the bundle type is passed as a type parameter to a method of the source module for point-to-point connection generation along with a value parameter that identifies the sink module. In some implementations, automatically generating 540 the point-to-point connection between the source module and the sink module includes automatically generating input/output ports for modules between the source module and the sink module at multiple levels of a register-transfer level module hierarchy of the integrated circuit design. For example, automatically generating 540 the point-to-point connection between the source module and the sink module may include implementing the process 600 of FIG. 6. For example, automatically generating 540 the point-to-point connection between the source module and the sink module may include using auto-punching to transcend multiple levels of a register-transfer level module hierarchy of the integrated circuit design when connecting the one or more named wires specified by the bundle type between the source module and the sink module. For example, software implementing an auto-punching function may be found at:
   https://github.com/freechipsproject/rocket-chip/blob/
      2c1ad08b7fb9beb80634839bdcf0e914dadf11dc/src/
      main/scala/diploma cy/LazyModule.scala#L239
A common usage example of this code to automatically punch input/output ports through modules can be found at:
   https://github.com/freechipsproject/rocket-chip/blob/
      2c1ad08b7fb9beb80634839bdcf0e914dadf11dc/src/
      main/scala/diploma cy/LazyModule.scala#L171
Representative snippets of this code are reproduced in Appendices B and C below. In some implementations, automatically generating 540 the point-to-point connection between the source module and the sink module includes invoking a Scala method that takes the bundle type as a type parameter. In some implementations, the bundle type specifies respective widths of the one or more named wires and the point-to-point connection is automatically generated 540 based on the respective widths of the one or more named wires. In some implementations, the bundle type specifies respective directionalities of the one or more named wires and the point-to-point connection is automatically generated 540 based on the respective directionalities of the one or more named wires. Appendix A below is an example of a code snippet in the Scala language that can used as part of an implementation of an interface for automatically generating 540, based on using the bundle type as a type parameterization input, a point-to-point connection between the source module and the sink module that includes the one or more named wires specified by the bundle type.

The process 500 includes generating 550 a register-transfer level data structure (e.g., a file, a database, a repository, or a bitstream) for the integrated circuit design including the source module, the sink module, and the point-to-point connection. For example, generating 550 the register-transfer level data structure for the integrated circuit design may include invoking a register-transfer level service with data based on the design parameters data structure. The automatically generated 540 the point-to-point connection may be encoded in a variety of ways, such as: as register-transfer level data or as input data for controlling a register-transfer level service to generate 550 the register-transfer level data structure including the point-to-point connection. In some implementations, automatically generated 540 the point-to-point connection is part of generating 550 the register-transfer level data structure for the integrated circuit design. In some implementations, automatically generated 540 the point-to-point connection is preparatory step that results in an intermediate encoding of the point-to-point connection that may be later used to generate 550 the register-transfer level data structure for the integrated circuit design.

The process 500 includes storing or transmitting 560 the register-transfer level data structure (e.g., a file, a database, a repository, or a bitstream). For example, the register-transfer level data structure may be transmitted 560 to an external device (e.g., a personal computing device) for display or storage. For example, the register-transfer level data structure may be stored 560 in memory (e.g., the memory 406). For example, the register-transfer level data structure may be transmitted 560 via a network communications interface (e.g., the network communications interface 418).

Although the process 500 is shown as a series of operations for clarity, implementations of the process 500 or any other technique, process, or algorithm described in connection with the implementations disclosed herein can be performed in various orders or concurrently. Additionally, operations in accordance with this disclosure can be performed with other operations not presented and described herein. For example, the process 500 of FIG. 5 may be part of a larger integrated circuit design flow (e.g., the process 700). Furthermore, one or more aspects of the systems and techniques described herein can be omitted. For example, operation 550 or the operation 560 may be omitted from the process 500 where a register-transfer level representation of the integrated circuit design is not a stage in an applicable design flow.

Figure 6:
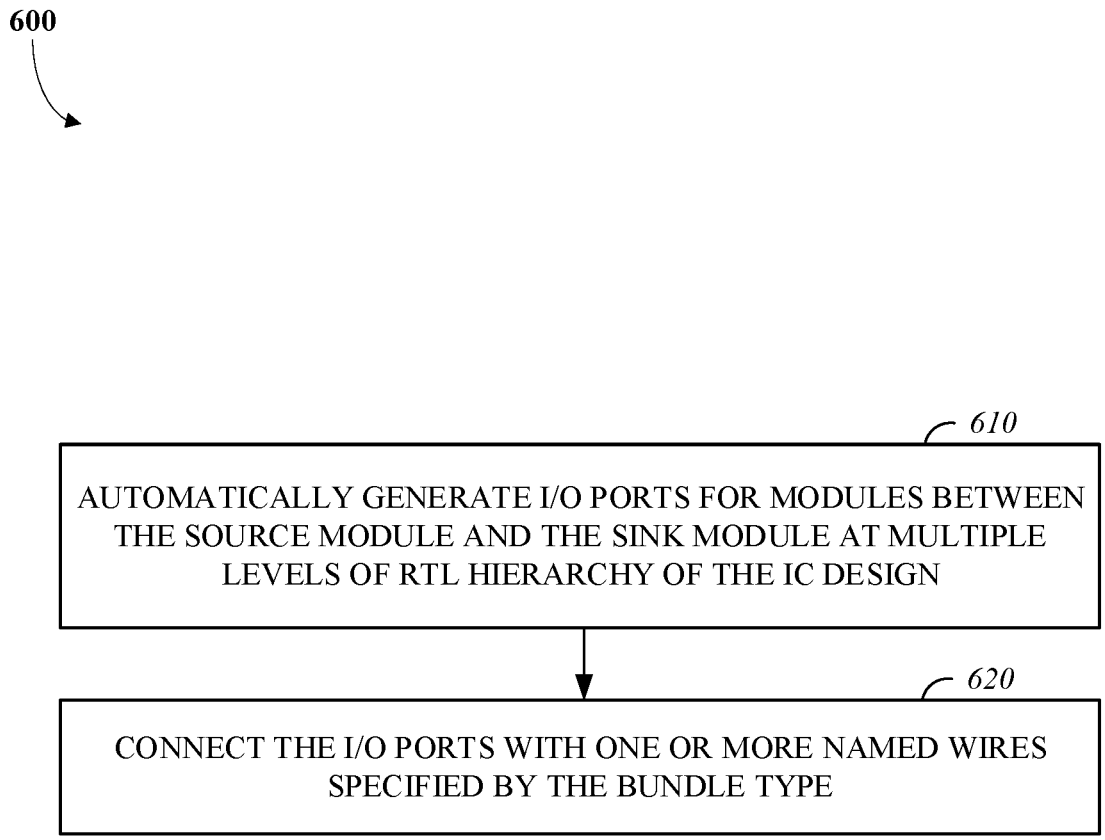
FIG. 6 is flow chart of an example of a process for generating a point-to-point connection between modules in an integrated circuit design.

FIG. 6 is flow chart of an example of a process 600 for generating a point-to-point connection between modules in an integrated circuit design. The process 600 includes automatically generating 610 input/output ports for modules between the source module and the sink module at multiple levels of a register-transfer level module hierarchy of the integrated circuit design; and connecting 620 the input/output ports with the one or more named wires specified by the bundle type. For example, the process 600 may be implemented by the system 300 of FIG. 3. For example, the process 600 may be implemented by the system 400 of FIG. 4.

The process 600 includes automatically generating 610 input/output ports for modules between the source module and the sink module at multiple levels of a register-transfer level module hierarchy of the integrated circuit design. For example, the input/output ports may be generated using tools, such as Scala, Chisel, Diplomacy, and/or FIRRTL. For example, automatically generating 610 input/output ports for modules between the source module and the sink module at multiple levels of a register-transfer level module hierarchy may include invoking a Diplomacy package in Chisel to determine a bus protocol for the one or more named wires specified by the bundle type.

The process 600 includes connecting 620 the input/output ports with the one or more named wires specified by the bundle type. For example, software including the codes snippets of Appendix B and/or Appendix C below may be used to implement the process 600.

Figure 7:
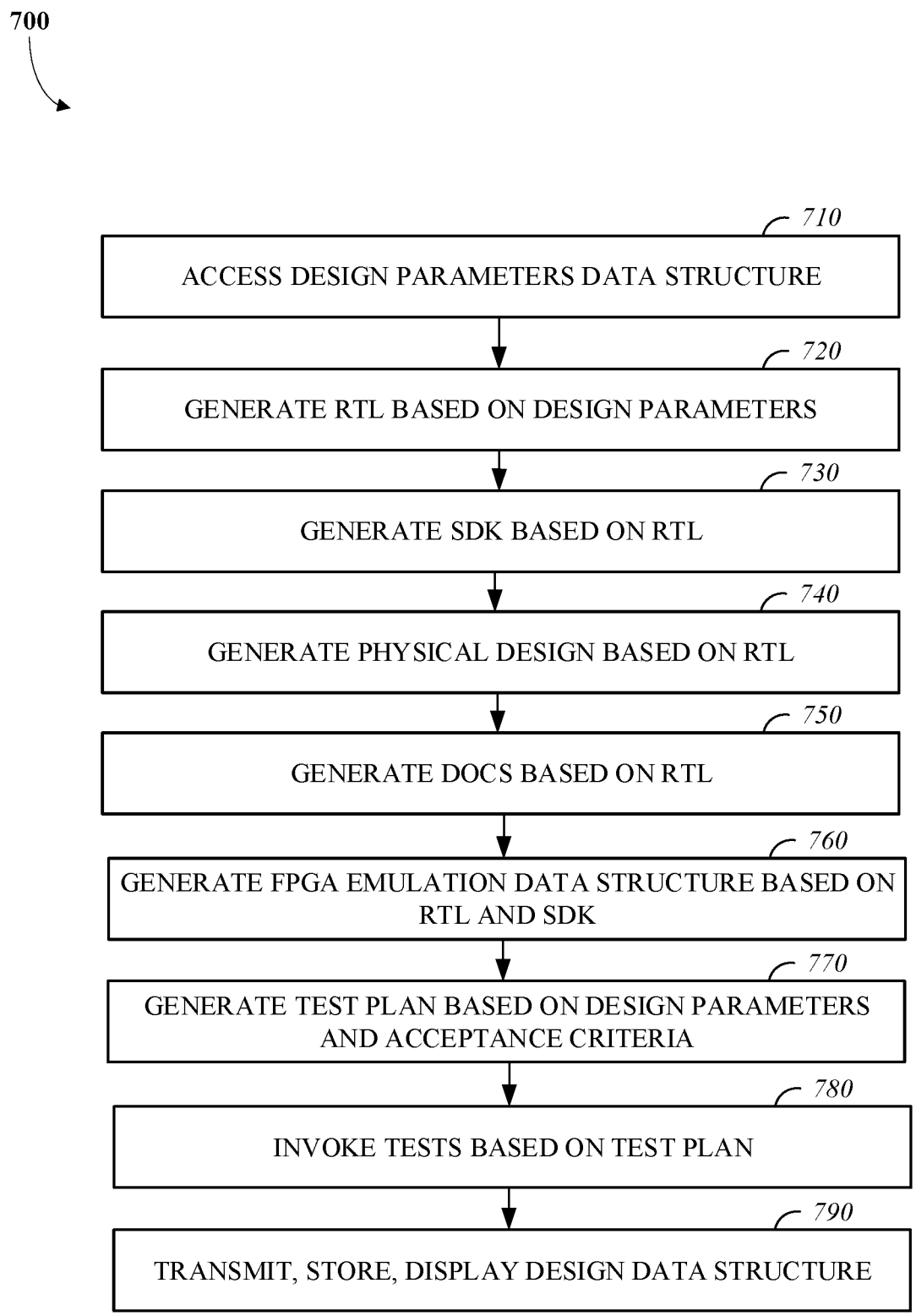
FIG. 7 is flow chart of an example of a process for facilitating design of integrated circuits.

FIG. 7 is flow chart of an example of a process 700 for facilitating design of integrated circuits. The process 700 includes accessing 710 a design parameters data structure; generating 720 a register-transfer level data structure for an integrated circuit based on the design parameters data structure; generating 730 a software development kit for the integrated circuit based on the register-transfer level data structure; generating 740 a physical design data structure for the integrated circuit based on the register-transfer level data structure; generating 750 documentation for the integrated circuit based on the register-transfer level data structure; generating 760 a field programmable gate array emulation data structure for the integrated circuit based on the register-transfer level data structure and the software development kit; generating 770 a test plan for an integrated circuit based on the design parameters data structure and acceptance criteria; invoking 780 tests for the integrated circuit based on the test plan, the register-transfer level data structure, the software development kit, and the physical design data structure to obtain a set of test results; and transmitting, storing, or displaying 790 a design data structure based on the register-transfer level data structure, the software development kit, the physical design data structure, and the test results. The process 700 may automatically generate and test an integrated circuit design conforming to design parameter values in a design parameters data structure in response to a single command (e.g., a build command). For example, the process 700 may be implemented by the integrated circuit design service infrastructure 310 of FIG. 3. For example, the process 700 may be implemented by the system 400 of FIG. 4. For example, the process 700 may be used to quickly incorporate a modular processor design with an input/output shell (e.g., the input/output shell of the integrated circuit design 100 of FIG. 1), including connecting modules of the design using automatically generated (e.g., using the process 500 of FIG. 5 and/or the process 600 of FIG. 6) point-to-point connections, in a system-on-a-chip design that can be rapidly tested. This approach may reduce processor development time, reduce the costs of testing a design, and/or improve the quality of test results.

The process 700 includes accessing 710 a design parameters data structure (e.g., a file, a database, a repository, or a bitstream). The design parameters data structure includes values of design parameters of an integrated circuit design. For example, the integrated circuit design may be of an IP core. For example, the integrated circuit design may be of a system-on-a-chip. For example, the design parameters data structure may include a JSON file. For example the design parameters of the design parameters data structure may include whether privilege modes are supported, whether multiply extension is supported, whether floating point extension is supported, whether error-correcting codes are supported in on-chip memory, the size of an instruction cache, an associativity of the instruction cache, a size of a data subsystem in on-chip memory, whether a port (e.g., a front port, a system port, a peripheral port, or a memory port) are included, a count of memory port channels, a port communication protocol selection, a bus width, a count of physical memory protection units, whether JTAG debugging is supported, a count of hardware breakpoints, whether instruction tracing is supported, whether debug direct memory access is supported, a count of local interrupts, whether a platform level interrupt controller is supported, a count of interrupt priority levels, a count of global interrupts, whether branch prediction is supported, a count of branch target buffer entries, a count of branch history table entries, and/or a selection of a manufacturing process. For example, the design parameters data structure may be accessed 710 by receiving the design parameters data structure (e.g., via network communications with a web client or a scripting API client using the network communications interface 418). For example, the design parameters data structure may be accessed 710 by reading the design parameters data structure from memory (e.g., reading from the memory 406 via the bus 404).

The process 700 includes generating 720 a register-transfer level data structure for an integrated circuit based on the design parameters data structure. For example, design parameters data structure may include a JSON file listing identifiers of design parameters and corresponding values. In some implementations, the design parameters data structure also includes an indication (e.g., a pointer, a name, or another identifier) that identifies a template integrated circuit design that the design parameters modify. For example, the template integrated circuit design may include modular design data structures that adhere to conventions for facilitating modular design. For example, generating 720 the register-transfer level data structure for the integrated circuit based on the design parameters data structure may include invoking a register-transfer level service with data based on the design parameters data structure.

For example, the register-transfer level data structure may include one or more Verilog files. The register-transfer level data structure may include updated configuration settings to drive later stages of an integrated circuit design pipeline. In some implementations, the register-transfer level data structure includes a memory map, one or more port assignments, and floorplan information.

The register-transfer level data structure (e.g., a register-transfer level file) may be automatically generated 720 based on the design parameters data structure using tools, such as Scala, Chisel, Diplomacy, and/or FIRRTL. For example, generating 720 the register-transfer level data structure for the integrated circuit may include executing Scala code to read the design parameters data structure and dynamically generate a circuit graph. In some implementations, generating 720 the register-transfer level data structure for the integrated circuit includes invoking a Diplomacy package in Chisel to determine a bus protocol for the integrated circuit.

Generating 720 the register-transfer level data structure for an integrated circuit based on the design parameters data structure may include automatically generating point-to-point connections between modules in the integrated circuit, which may be, for example, modules in different template designs that are merged in the integrated circuit in accordance with design parameters in the generating 720 a register-transfer level data structure for an integrated circuit based on the design parameters data structure. For example, the process 500 of FIG. 5 may be implemented to generate 720 point-to-point connections between modules in the register-transfer level data structure.

The process 700 includes generating 730 a software development kit for the integrated circuit based on the register-transfer level data structure. In some implementations, generating 730 the software development kit for the integrated circuit includes generating loaders for a Verilog simulator and a physical field programmable gate array to be flashed. For example, generating 730 the software development kit may include accessing an existing toolchain or software development kit for a template integrated circuit design that is identified by the design parameters data structure. The existing toolchain or software development kit (e.g., a RISC-V toolchain/SDK) may be set up using conventions suitable for configurability. For example, the existing toolchain or software development kit may be organized into submodules corresponding to design parameters of the design parameters data structure. For example, the software development kit may include a compiler, an assembler, header files, libraries, boot loaders, kernel drivers, and/or other tools for a fully functional SDK/computing environment. For example, generating 730 the software development kit may include executing a Python script. In some implementations, generating 730 the software development kit includes parsing the register-transfer level data structure (e.g., a JSON file), generating options for the tools and builds, generating header files responsive to a memory map, selecting appropriate examples from the existing toolchain or software development kit, generating relevant configuration files for target simulators (e.g., QEMU (Quick Emulator)) so they can run the new design on another processor (e.g., x86), and generating loaders for Verilog simulators and physical FPGA boards to be flashed. The resulting software development kit may be built and tested in the cloud (e.g., before giving to customer). For example, generating 730 the software development kit may include invoking a software development kit service with data based on the register-transfer level data structure and/or the design parameters data structure.

The process 700 includes generating 740 a physical design data structure (e.g., a physical design file) for the integrated circuit based on the register-transfer level data structure. For example, generating 740 a physical design data structure for the integrated circuit may include invoking a physical design service with data based on the register-transfer level data structure and/or the design parameters data structure. For example, generating 740 a physical design data structure for the integrated circuit may include invoking synthesis and place & route tools (e.g., Synopsys, Cadence, and/or Mentor tools). For example, generating 740 a physical design data structure for the integrated circuit may include performing logical equivalent checking. For example, generating 740 a physical design data structure for the integrated circuit may include invoking static timing analysis tools. For example, generating 740 a physical design data structure for the integrated circuit may include performing design rule checking (DRC) and/or layout versus schematic (LVS) checking. For example, generating 740 a physical design data structure for the integrated circuit may include determining power, performance, and area estimates for the resulting integrated circuit design and providing these estimates as feedback to a user (e.g., a user of a web client). For example, the physical design data structure may include in less-technical terms whether there are any issues with the physical design. For example, the physical design data structure may highlight important components of the output of the synthesis and place & route tools. For example, the physical design data structure may include a GDSII file or an OASIS file. For example, generating 740 a physical design data structure for the integrated circuit may include managing and orchestrating physical design toolchains in a cloud. For example, generating 740 a physical design data structure for the integrated circuit may include handling database movement from tool to tool, and managing access to third party IP cores. For example, generating 740 a physical design data structure for the integrated circuit may include accessing template designs, which may allow for significant design reuse. For example, generating 740 a physical design data structure for the integrated circuit may include identifying those combinations to reduce workload. For example, generating 740 a physical design data structure for the integrated circuit may provide better or more compact error/issue reporting, by translating tool issues into manageable feedback and providing the actual error/output of tools in a deliverable format to a user (e.g., a user of a web client). For example, generating 740 a physical design data structure for the integrated circuit may include using physical design blocks for identified pairings of functional blocks that may be reused across designs to improve efficiency.

The process 700 includes generating 750 documentation for the integrated circuit based on the register-transfer level data structure. For example, generating 750 documentation for the integrated circuit may include using Prince (available at https://www.princexml.com/). For example, generating 750 documentation for the integrated circuit may include using ASCII Doc (available at http://asciidoc.org/). For example, generating 750 documentation for the integrated circuit may include accessing a pre-loaded modular manual for a template integrated circuit design that is identified by the design parameters data structure. The modular manual may be set up using conventions suitable for configurability. For example, the modular manual may be organized into submodules corresponding to design parameters of the design parameters data structure. In some implementations, the modular manual is stored as multiple components in corresponding directories of an existing SDK for the template. Generating 750 documentation for the integrated circuit may include generalizing the pre-loaded modular manual to respond to values of design parameters in the design parameters data structure. For example, the generated 750 documentation may be in an HTML format and/or in a PDF format. In order to correctly document the memory map/ports, generating 750 documentation for the integrated circuit may include working with the post-RTL output. For example, generating 750 documentation for the integrated circuit may include utilizing a documentation framework similar to the React framework (e.g., a JS HTML framework). In some implementations, documentation blocks have a respective piece of python code that takes in an RTL output configuration file and breaks it down into the chunks that ASCII Doc requires and invokes content generation. For example, generating 750 documentation for the integrated circuit may include invoking a documentation service with data based on the register-transfer level data structure and/or the design parameters data structure.

The process 700 includes generating 760 a field programmable gate array emulation data structure (e.g., a field programmable gate array emulation file) for the integrated circuit based on the register-transfer level data structure and the software development kit. For example, the field programmable gate array emulation data structure for the integrated circuit may be configured to utilize a cloud based field programmable gate array (FPGA). For example, generating 760 a field programmable gate array emulation data structure for the integrated circuit may include invoking a cloud based FPGA synthesis tool. For example, generating 760 a field programmable gate array emulation data structure for the integrated circuit may include invoking emulation platforms, such as, Palladium (from Cadence), Veloce (from Mentor Graphics), and/or Zebu (from Synopsys). For example, the field programmable gate array emulation data structure for the integrated circuit may be configured to handle emulating devices hard drives and network devices. For example, the field programmable gate array emulation data structure may include an emulation file and supporting materials. In some implementations, the field programmable gate array emulation data structure for the integrated circuit may provide for emulation of a whole system, including peripherals, operating together (e.g., memory timing needs to be matched). For example, the peripherals emulated may be the actual peripherals a user has selected in the web interface generated by a web application server. For example, generating 760 a field programmable gate array emulation data structure for the integrated circuit may include highly detailed use of existing tools based on the parameterized integrated circuit design. For example, generating 760 a field programmable gate array emulation data structure for the integrated circuit may include invoking the FPGA/Emulator toolchain, setting up the emulated devices, and compiling the emulated devices. For example, generating 760 a field programmable gate array emulation data structure for the integrated circuit may include invoking a FPGA/emulation service with data based on the register-transfer level data structure and/or the design parameters data structure.

The process 700 includes generating 770 a test plan for an integrated circuit based on the design parameters data structure and acceptance criteria. In some implementations, the acceptance criteria are received with the design parameters data structure (e.g., received from a web client or received from a scripting API client). In some implementations, the acceptance criteria are read from memory (e.g., the memory 406). For example, generating 770 a test plan for an integrated circuit may include invoking Verilog simulators (e.g., open source Verilog simulators). For example, the test plan for an integrated circuit may include utilizing FPGAs. For example, the test plan for an integrated circuit may include utilizing software simulators, such as Quick Emulator (QEMU), Spike, and/or other software simulators. In some implementations, multiple target test platforms look the same so the test plan for an integrated circuit may include moving the workloads across different cost options (e.g., using physical FPGAs vs. cheaper using pre-emptible cloud instances). For example, a test plan for an integrated circuit may be generated 770 based on the register-transfer level data structure (e.g., including Verilog RTL), the software development kit, the physical design data structure (e.g., including a GDSII file), a corpus of tests, and corresponding acceptance criteria. In some implementations, generating 770 a test plan for an integrated circuit may include responding to varying acceptance criteria that are user-defined. Given acceptance criteria and a design configuration, a test plan may be generated 770 automatically. For example, generating 770 a test plan for an integrated circuit may include defining environments, filtering out tests that cannot be run given a corpus of tests and a hardware and software design generated based on the design parameters data structure, and generating the test plan to include a sequence of selected tests for the integrated circuit design. For example, an environment may define a test platform. There may be additional components in a test bench, outside the device under test, and it may be beneficial to standardize these environments across designs. For example, a way to end a test may be standardized within a test platform. Some test platforms may define a register a CPU can write to that is defined within the test bench, while some test platforms will wiggle a general purpose input/output (GPIO) pin in a certain way. Given a test plan, many test platforms may be used for all tests.

The process 700 includes invoking 780 tests for the integrated circuit based on the test plan, the register-transfer level data structure, the software development kit, and the physical design data structure to obtain a set of test results. For example, the invoked 780 verification tests may be executed directly by a controller, by a verification service, and/or by an external service (e.g., a cloud based FPGA or emulation service that is accessed via communications over a network). In some implementations, invoking 780 tests for the integrated circuit may include invoking a test using a field programmable gate array, programmed based on the field programmable gate array emulation data structure, to obtain an emulation result. The field programmable gate array may be operating on a cloud server. For example, invoking 780 tests for the integrated circuit may include using credentials (e.g., a login and/or password) to invoke the test on the field programmable gate array operating on a cloud server. For example, the test results may include summary information for a large number of tests, such as a binary indication of whether all acceptance criteria were met by the generated integrated circuit design, or a list of binary indications of whether individual verification tests were passed for respective verification tests included in the test plan.

The process 700 includes transmitting, storing, or displaying 790 a design data structure based on the register-transfer level data structure, the software development kit, the physical design data structure, and the test results. For example, the design data structure may be a collection of files, an archive, or a repository (e.g., a GitHub repository) that includes data from the register-transfer level data structure, the software development kit, the physical design data structure, and the test results. For example, the design data structure may also include the documentation generated 750 and/or the field programmable gate array emulation data structure generated 760. For example, the design data structure may be transmitted 790 to an external device (e.g., a personal computing device) for display or storage. For example, the design data structure may be stored 790 in memory (e.g., the memory 406). For example, design data structure may be displayed 790 in a user interface (e.g., the user interface 420). For example, the design data structure may be transmitted 790 via a network communications interface (e.g., the network communications interface 418).

Although the process 700 is shown as a series of operations for clarity, implementations of the process 700 or any other technique, process, or algorithm described in connection with the implementations disclosed herein can be performed in various orders or concurrently. Additionally, operations in accordance with this disclosure can be performed with other operations not presented and described herein. Furthermore, one or more aspects of the systems and techniques described herein can be omitted. For example, operation 750 may be omitted from the process 700.

Figure 8:
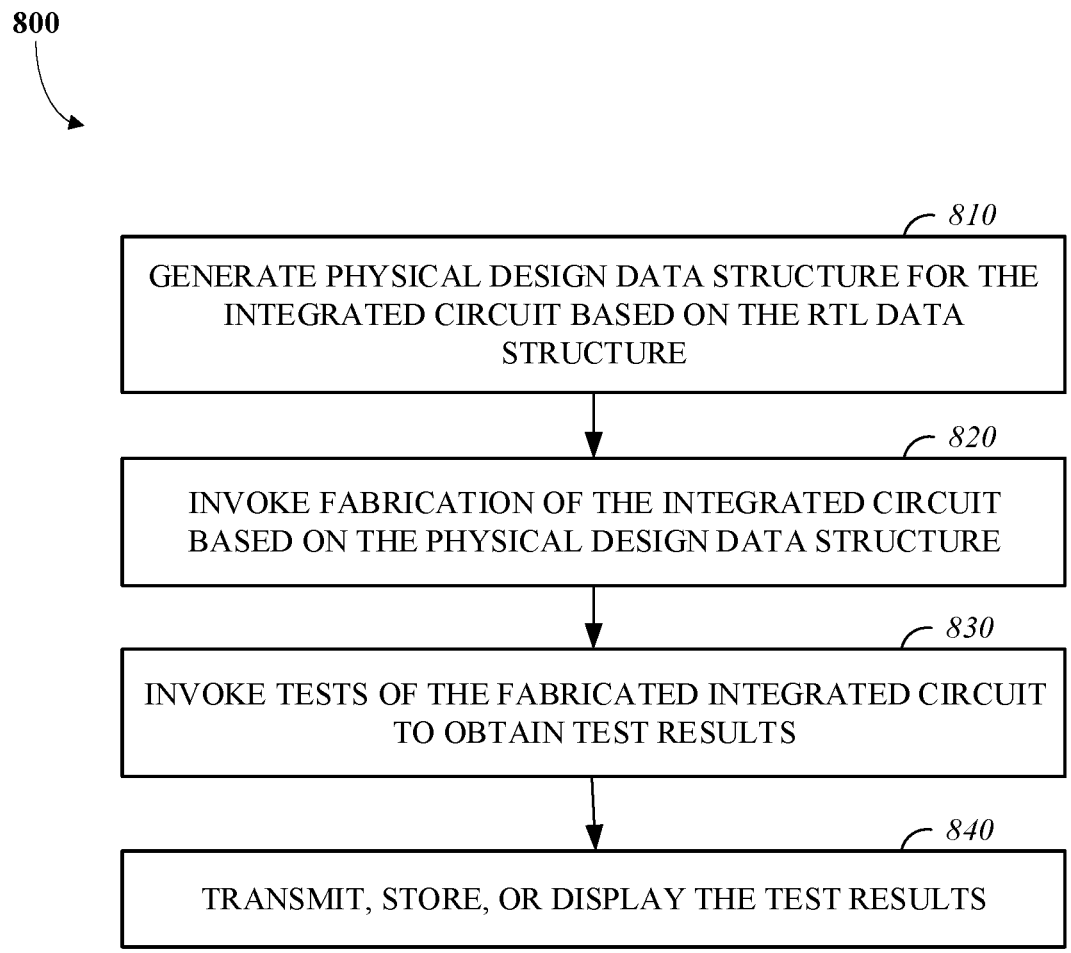
FIG. 8 is flow chart of an example of a process for fabricating and testing of an integrated circuit based on a register-transfer level data structure.

FIG. 8 is flow chart of an example of a process 800 for fabricating and testing of an integrated circuit based on a register-transfer level data structure. The process 800 includes generating 810 a physical design data structure for the integrated circuit based on the register-transfer level data structure; invoking 820 fabrication of the integrated circuit based on the physical design data structure; invoking 830 tests of the fabricated integrated circuit to obtain a set of test results; and transmitting, storing, or displaying 840 the set of test results. For example, the process 800 may be implemented by the integrated circuit design service infrastructure 310 of FIG. 3. For example, the process 800 may be implemented by the system 400 of FIG. 4. For example, the process 800 may be used to quickly incorporate a modular processor design with an input/output shell (e.g., the input/output shell of the integrated circuit design 100 of FIG. 1), including connecting modules of the design using automatically generated (e.g., using the process 500 of FIG. 5 and/or the process 600 of FIG. 6) point-to-point connections, in a system-on-a-chip design that can be rapidly tested in silicon. This approach may reduce processor development time, reduce the costs of testing a design, and/or improve the quality of test results.

The process 800 includes generating 810 a physical design data structure for the integrated circuit based on a register-transfer level data structure (e.g., a register-transfer level data structure obtained using the process 500 of FIG. 5 and/or the process 600 of FIG. 6). For example, generating 810 a physical design data structure for the integrated circuit may include invoking a physical design service with data based on the register-transfer level data structure and/or the design parameters data structure. For example, generating 810 a physical design data structure for the integrated circuit may include invoking synthesis and place & route tools (e.g., Synopsys, Cadence, and/or Mentor tools). For example, generating 810 a physical design data structure for the integrated circuit may include performing logical equivalent checking. For example, generating 810 a physical design data structure for the integrated circuit may include invoking static timing analysis tools. For example, generating 810 a physical design data structure for the integrated circuit may include performing design rule checking (DRC) and/or layout versus schematic (LVS) checking. For example, generating 810 a physical design data structure for the integrated circuit may include determining power, performance, and area estimates for the resulting integrated circuit design and providing these estimates as feedback to a user (e.g., a user of a web client). For example, the physical design data structure may include in less-technical terms whether there are any issues with the physical design. For example, the physical design data structure may highlight important components of the output of the synthesis and place & route tools. For example, the physical design data structure may include a GDSII file or an OASIS file. For example, generating 810 a physical design data structure for the integrated circuit may include managing and orchestrating physical design toolchains in a cloud. For example, generating 810 a physical design data structure for the integrated circuit may include handling database movement from tool to tool, and managing access to third party IP cores. For example, generating 810 a physical design data structure for the integrated circuit may include accessing template designs, which may allow for significant design reuse. For example, generating 810 a physical design data structure for the integrated circuit may include identifying those combinations to reduce workload. For example, generating 810 a physical design data structure for the integrated circuit may provide better or more compact error/issue reporting, by translating tool issues into manageable feedback and providing the actual error/output of tools in a deliverable format to a user (e.g., a user of a web client). For example, generating 810 a physical design data structure for the integrated circuit may include using physical design blocks for identified pairings of functional blocks that may be reused across designs to improve efficiency.

The process 800 includes invoking 820 fabrication of the integrated circuit based on the physical design data structure. In some implementations, a physical design specification (e.g., a GDSII file) based on a physical design data structure for the integrated circuit is transmitted via a network (e.g., the network 306) to a manufacturer server (e.g., the manufacturer server 330) to invoke 820 fabrication of the integrated circuit (e.g., using manufacturing equipment of the associated manufacturer). For example, the manufacturer server 330 may host a foundry tape out website that is configured to receive physical design specifications (e.g., as a GDSII file or an OASIS file) to schedule or otherwise facilitate fabrication of integrated circuits. In some implementations, fabrication of the integrated circuit may be invoked 820 by direct control of manufacturing equipment (e.g., via communication over a bus or serial port).

The process 800 includes invoking 830 tests of the fabricated integrated circuit to obtain a set of test results. The tests may be performed in the same facility as the fabrication, or the integrated circuit may be physically transferred (e.g., via mail) to another facility for testing. The integrated circuit may be connected to testing apparatus, which may be controlled to invoke 830 tests of the fabricated integrated circuit. For example, invoking 830 tests of the fabricated integrated circuit to obtain a set of test results may include transmitting commands, including parts of a test plan for the integrated circuit, to a cloud-based server (e.g., the silicon testing server 340) controlling the testing apparatus.

The process 800 includes transmitting, storing, or displaying 840 the set of test results. For example, the set of test results may be transmitted 840 to an external device (e.g., a personal computing device) for display or storage. For example, the set of test results may be stored 840 in memory (e.g., the memory 406). For example, set of test results may be displayed 840 in a user interface (e.g., the user interface 420). For example, the set of test results may be transmitted 840 via a network communications interface (e.g., the network communications interface 418).

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or semiconductor device. Other suitable mediums are also available. Such computer-usable or computer-readable media can be referred to as non-transitory memory or media, and can include RAM or other volatile memory or storage devices that can change over time. For example, a non-transitory computer-readable storage medium may include executable instructions that, when executed by a processor, cause performance of an operations to implement the process 500 of FIG. 5 or the process 600 of FIG. 6.

Appendix A below is an example of a code snippet in the Scala language that can used as part of an implementation of an interface for automatically generating point-to-point connections in an integrated circuit design using type parameterization to specify bundles of wires to be included in a connection. For example, the code snippet of the Appendix A may be used as part of an implementation of an interface that can be used to perform the process 500 of FIG. 5. Appendix B below is an example of a code snippet in the Scala language that can used as part of an implementation of an interface for auto-punching wires through multiple levels of a module hierarchy in an integrated circuit design. For example, the code snippet of the Appendix B may be used as part of an implementation of an interface that can be used to perform the process 500 of FIG. 5. Appendix C below is an example of a code snippet in the Scala language that can used to access an interface for auto-punching wires through multiple levels of a module hierarchy in an integrated circuit design. For example, the code snippet of the Appendix C may be used as part of an implementation of an interface that can be used to perform the process 500 of FIG. 5.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures.

Appendix A

```
package freechips.rocketchip.diplomacy
import chisel3._
import chisel3.internal.sourceinfo.SourceInfo
import freechips.rocketchip.config.{Parameters,Field}
case class BundleBridgeParams[T<: Data](gen: ( )=>T)
case class BundleBridgeNull( )
class BundleBridgeImp[T<: Data]( ) extends SimpleNode-
    Imp[BundleBridgeParams[T], BundleBridgeNull, Bund-
    leBridgeParams[T], T]
{
    def edge(pd: BundleBridgeParams[T], pu: BundleBrid-
        geNull, p: Parameters, sourceInfo: SourceInfo)=pd
    def bundle(e: BundleBridgeParams[T])=e.gen( )
    def render(e: BundleBridgeParams[T])=RenderedEdge
        (colour="#cccc00"/* yellow */)
}
case class BundleBridgeSink[T<: Data]( )(implicit val-
    Name: ValName) extends SinkNode(new BundleBridge-
    Imp[T])(Seq(BundleBridgeNull( )))
{
    def io: T=in(0)._1
}
case class BundleBridgeSource[T<: Data](gen: ( )=>T)(im-
    plicit valName: ValName) extends SourceNode(new Bun-
    dleBridgeImp[T])(Seq(BundleBridgeParams(gen)))
{
    def sink(implicit p: Parameters)=
        val sink=BundleBridgeSink[T]( )
        sink:=this
        sink
}
}
class BundleBridge[D<: Data, T<: LazyModule](lm:=>T
    {val module: {val io: D }})(implicit p: Parameters)
    extends LazyModule
{
    val child=LazyModule(lm)
    val ioNode=BundleBridgeSource(( )=>child.module.io-
        .cloneType)
    lazy val module=new LazyModuleImp(this) {
        val (io, J=ioNode.out(0)
        io< >child.module.io
    }
}
/* Usage:
    // Wrap up SomeDevice's module.io Bundle into an
        ioNode
    * val (ioNode, device)=BundleBridge(new SomeDevice)
    // BundleBridge( ) replaces LazyModule( )
    * // Somewhere else in the design in LazyModule scope:
    * val sink=ioNode.sink // creates a sink node of matching
        type
    * // In LazyModuleImp scope:
    * val io=sink.io // io is a Wire 0 connected to devic-
        e.module.io
    */
object BundleBridge
{
    def apply[D<: Data, T<: LazyModule](lm: =>T {val mod-
        ule: {val io: D}})(implicit p: Parameters)={
        val bridge=LazyModule(new BundleBridge(lm))
        (bridge.ioNode, bridge.child)
    }
}
```

Appendix B

```
// -----------------------------
final class AutoBundle(elts: (String, Data, Boolean)*)
    extends Record {
    // We need to preserve the order of elts, despite grouping
        by name to disambiguate things
    val elements=ListMap( )++
elts.zipWithIndex.map(makeElements).groupBy(_._1).val-
    ues.flatMap {
    case Seq((key, element, i))=>Seq(i->(key->element))
    case seq=>seq.zipWithIndex.map {case ((key, element, i),
        j)=>i->(key+"_"+j->element)
}.toList.sortBy(_._1).map(_._2)
require (elements.size==elts.size)
private def makeElements(tuple: ((String, Data, Boolean),
    Int))={
    val ((key, data, flip), i)=tuple
    // trim trailing_0_1_2 stuff so that when we append _# we
        don't create collisions
    val regex=new Regex("(_[0-9]+)*$")
    val element=if (flip) data.cloneType.flip else data.clone-
        Type
    (regex.replaceAllIn(key, " "), element, i)
}
    override def cloneType=(new AutoBundle(elts:_*)).asIn-
        stanceOf[this.type]
}
```

Appendix C

```
sealed trait LazyModuleImpLike extends RawModule
{
    val wrapper: LazyModule
    val auto: AutoBundle
    protected[diplomacy] val dangles: Seq[Dangle]
    require (!LazyModule. scope.isDefined, s"S{wrapper-
        name}.module was constructed before LazyModule( )
        was run on $ {LazyModule.scope.get.name}")
    override def desiredName=wrapper.desiredName
    suggestName(wrapper. suggestedName)
    implicit val p=wrapper.p
    protected[diplomacy] def instantiate( )={
        val    childDangles=wrapper.children.reverse.flatMap
            {c=>
            implicit val sourceInfo=c.info
            val mod=Module(c.module)
            mod.finishInstantiate( )
            mod. dangles
        }
        val    nodeDangles=wrapper.nodes.reverse.flatMap(_.in-
            stantiate( ))
        val allDangles=nodeDangles++childDangles
        val    pairing=SortedMap(allDangles.groupBy(_.source).
            toSeq:_*)
        val    done=Set(  )++pairing.values.filter(_.size==2).map
            {case Seq(a, b)=>
            require (a.flipped !=b.flipped)
            if (a.flipped) a.data < >b.data} else b.data < >a.data}
            a. source
        }
        val forward=allDangles.filter(d=>!done(d.source))
        val auto=IO(new AutoBundle(forward.map{d=>(d.name,
            d.data, d.flipped)}:_*))
```

```
val dangles=(forward zip auto.elements) map case (d, (_,
    io))=>
  if (d.flipped){d.data < >io} else {io< >d.data}
  d.copy(data=io,   name=wrapper.suggestedName+"_"+
    d.name)
  }
  wrapper.inModuleBody.reverse.foreach ( )}
  (auto, dangles)
}
  protected[diplomacy] def finishInstantiate( ){
    wrapper.nodes.reverse.foreach {_.finishInstantiate( )}
  }
}
class LazyModuleImp(val wrapper: LazyModule) extends
    MultiIOModule with LazyModuleImpLike
  val (auto, dangles)=instantiate( )
}
class LazyRawModuleImp(val wrapper: LazyModule)
    extends RawModule with LazyModuleImpLike
  val childClock=Wire(Clock( ))
  val childReset=Wire(Bool( ))
  childClock:=Bool(false).asClock
  childReset:=Bool(true)
  val (auto, dangles)=withClockAndReset(childClock, chil-
    dReset) {instantiate( )
  }
}
```

What is claimed is:

1. A method comprising:
accessing an indication of a source module of an integrated circuit design;
accessing an indication of a sink module of the integrated circuit design;
accessing an indication of a bundle type, wherein the bundle type specifies one or more named wires;
automatically generating, based on using the bundle type as a type parameterization input, a point-to-point connection between the source module and the sink module that includes the one or more named wires specified by the bundle type;
generating a register-transfer level data structure for the integrated circuit design including the source module, the sink module, and the point-to-point connection; and
storing or transmitting the register-transfer level data structure.

2. The method of claim 1, wherein automatically generating the point-to-point connection between the source module and the sink module comprises:
automatically generating input/output ports for modules between the source module and the sink module at multiple levels of a register-transfer level module hierarchy of the integrated circuit design.

3. The method of claim 1, wherein automatically generating the point-to-point connection between the source module and the sink module comprises:
using auto-punching to transcend multiple levels of a register-transfer level module hierarchy of the integrated circuit design when connecting the one or more named wires specified by the bundle type between the source module and the sink module.

4. The method of claim 1, wherein automatically generating the point-to-point connection between the source module and the sink module comprises:
invoking a Scala method that takes the bundle type as a type parameter.

5. The method of claim 1, wherein the bundle type specifies respective widths of the one or more named wires and the point-to-point connection is automatically generated based on the respective widths of the one or more named wires.

6. The method of claim 1, wherein the bundle type specifies respective directionalities of the one or more named wires and the point-to-point connection is automatically generated based on the respective directionalities of the one or more named wires.

7. The method of claim 1, wherein the source module includes a processor core and the sink module is a component of an input/output shell for a system-on-a-chip design.

8. The method of claim 1, comprising:
generating a physical design data structure for an integrated circuit based on the register-transfer level data structure;
invoking fabrication of the integrated circuit based on the physical design data structure;
invoking tests of the fabricated integrated circuit to obtain a set of test results; and
transmitting, storing, or displaying the set of test results.

9. The method of claim 1, comprising:
generating a physical design data structure for an integrated circuit based on the register-transfer level data structure;
generating a software development kit for the integrated circuit based on the register-transfer level data structure;
generating a test plan for the integrated circuit;
invoking tests for the integrated circuit based on the test plan, the register-transfer level data structure, the software development kit, and the physical design data structure to obtain test results; and
transmitting, storing, or displaying a design data structure based on the register-transfer level data structure, the software development kit, the physical design data structure, and the test results.

10. A system comprising:
a network interface;
a memory; and
a processor, wherein the memory includes instructions executable by the processor to cause the system to:
access an indication of a source module of an integrated circuit design;
access an indication of a sink module of the integrated circuit design;
access an indication of a bundle type, wherein the bundle type specifies one or more named wires;
automatically generate, based on using the bundle type as a type parameterization input, a point-to-point connection between the source module and the sink module that includes the one or more named wires specified by the bundle type; and
generate a register-transfer level data structure for the integrated circuit design including the source module, the sink module, and the point-to-point connection.

11. The system of claim 10, wherein the memory includes instructions executable by the processor to cause the system to:
automatically generate input/output ports for modules between the source module and the sink module at multiple levels of a register-transfer level module hierarchy of the integrated circuit design.

12. The system of claim 10, wherein the memory includes instructions executable by the processor to cause the system to:
use auto-punching to transcend multiple levels of a register-transfer level module hierarchy of the integrated circuit design when connecting the one or more named wires specified by the bundle type between the source module and the sink module.

13. The system of claim 10, wherein the memory includes instructions executable by the processor to cause the system to:
invoke a Scala method that takes the bundle type as a type parameter.

14. The system of claim 10, wherein the bundle type specifies respective widths of the one or more named wires and the point-to-point connection is automatically generated based on the respective widths of the one or more named wires.

15. The system of claim 10, wherein the bundle type specifies respective directionalities of the one or more named wires and the point-to-point connection is automatically generated based on the respective directionalities of the one or more named wires.

16. The system of claim 10, wherein the source module includes a processor core and the sink module is a component of an input/output shell for a system-on-a-chip design.

17. A non-transitory computer-readable storage medium that includes instructions that, when executed by a processor, facilitate performance of operations comprising:
accessing an indication of a source module of an integrated circuit design;
accessing an indication of a sink module of the integrated circuit design;
accessing an indication of a bundle type, wherein the bundle type specifies one or more named wires;
automatically generating, based on using the bundle type as a type parameterization input, a point-to-point connection between the source module and the sink module that includes the one or more named wires specified by the bundle type;
generating a register-transfer level data structure for the integrated circuit design including the source module, the sink module, and the point-to-point connection; and
storing or transmitting the register-transfer level data structure.

18. The non-transitory computer-readable storage medium of claim 17, wherein automatically generating the point-to-point connection between the source module and the sink module comprises:
automatically generating input/output ports for modules between the source module and the sink module at multiple levels of a register-transfer level module hierarchy of the integrated circuit design.

19. The non-transitory computer-readable storage medium of claim 17, wherein the bundle type specifies respective widths of the one or more named wires and the point-to-point connection is automatically generated based on the respective widths of the one or more named wires.

20. The non-transitory computer-readable storage medium of claim 17, wherein the bundle type specifies respective directionalities of the one or more named wires and the point-to-point connection is automatically generated based on the respective directionalities of the one or more named wires.

* * * * *